United States Patent Office 3,255,349
Patented June 7, 1966

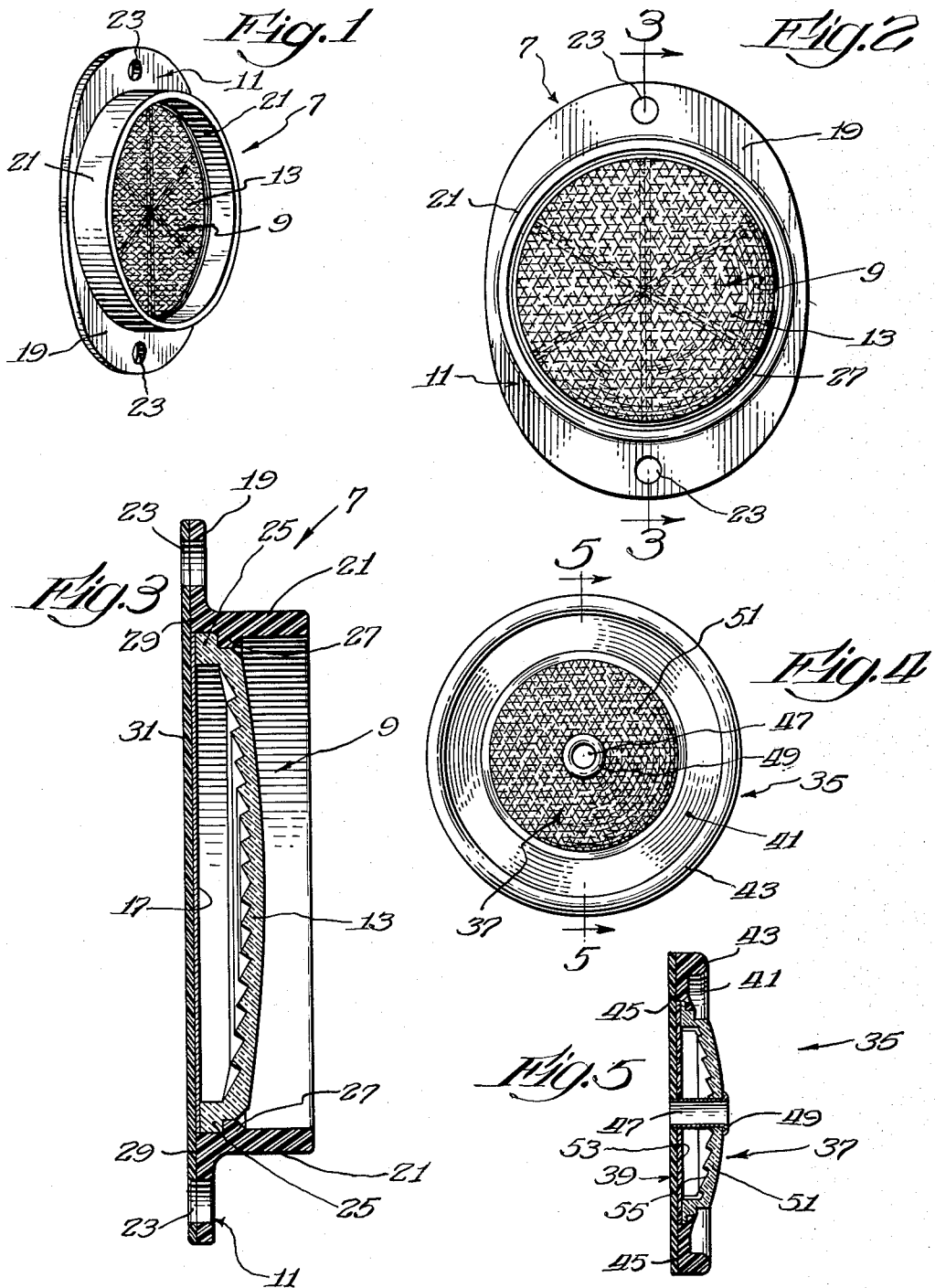

3,255,349
SELF-LUMINOUS HIGHWAY MARKER
Sampson Isenberg, Chicago, Ill., assignor to Canrad Precision Industries, Inc., Manhattan, N.Y., a corporation of Delaware
Filed Nov. 28, 1962, Ser. No. 240,562
4 Claims. (Cl. 250—77)

This invention relates to signaling devices and more particularly to signaling devices such as highway markers, reflectors for vehicles and the like which utilize a reflecting surface in combination with a phosphorescent member.

For numerous applications, especially those in connection with highway safety, it is desirable to provide a signaling device which will intensely reflect a beam of light directed upon it so that it can be clearly seen at considerable distances and at a wide variety of angles. Highway markers and the like in use at the present time generally utilize reflecting surfaces which are located so as to reflect the light from the headlights of a vehicle back to the driver of the vehicle and thereby outline the general contour of the highway ahead. Reflectors placed on the rear of trucks, vehicles, bicycles and the like serve to make one aware of such vehicles earlier than would otherwise be the case. However, these types of reflectors and signaling devices which are presently used on highways or on vehicles are visible only when illuminated by beams of light. Such devices are of little value to people driving along a highway in vehicles with weak, faulty or misdirected headlights, or to persons walking along the highway.

Thus, it is an object of the present invention to provide an improved signaling device that can be readily seen at wide angles and considerable distances. Another object of the present invention is to provide a signaling device which intensely reflects a beam of light and which is also visible without light. A further object of the invention is to provide a double-action signaling device which gives off a phosphorescent glow across its entire surface area and yet also reflects light directed upon it. A still further object is to provide a device of the type described which is simple in construction, economical to manufacture and very effective for its intended use.

These and other objects of the present invention will be apparent from the following description when read in conjunction with the attached drawings wherein:

FIGURE 1 is a perspective view of a signaling device embodying various of the features of the invention;

FIGURE 2 is an enlarged front view of the device shown in FIGURE 1;

FIGURE 3 is an enlarged sectional view taken along line 3—3 of FIGURE 2;

FIGURE 4 is a front view of an alternate embodiment of a signalling device illustrating various of the features of the invention; and FIGURE 5 is a sectional view taken along line 5—5 of FIGURE 4.

A signaling device in accordance with the present invention includes a diffusion-type reflecting member and an element which extends outward relative to the reflecting member to aid in directing light in selected directions and hereby allows the device to be clearly seen at greater angles. Preferably, a portion of the signaling device, including the outwardly extending element, is made phosphorescent to provide a double-action device that reflects light and gives off a glow of its own that is visible without other light. In another embodiment of the device, a diffusion-type reflector of translucent material is disposed in front of a phosphorescent base to produce a reflecting device which has an overall phosphorescent glow across its entire front surface.

In the illustrated signaling device 7 shown in FIGURE 1 of the drawings, a circular reflecting member 9 is disposed centrally in a supporting base 11. The reflecting member 9 may be any form of diffusion type reflector which reflects light back in the direction from which it is beamed with a scintillating jewel-like effect. In the illustrated embodiment, a glass lens 13 is provided which has prismatic undercuttings in its rear surface which create a multitude of reflecting surfaces that reflect light directed upon the front surface of the lens 13. Red or green lenses, or lenses of glass or plastic of other colors, may be used. The reflecting member 9 also includes a disc-like element 17 of a shiny material, such as aluminum or tin, having generally the outline of the reflecting member 9. This element 17 is disposed adjacent the rear surface of the glass lens 13 and generally improves the reflecting characteristics of the reflecting member 9.

The supporting base 11 comprises a flat plate 19 and an upstanding element or ridge 21 which projects outwardly from the front surface of the plate 19. The ridge 21 is so proportioned that the reflecting member 9 can be disposed in the center thereof and that when the member 9 is so located, it is recessed therewithin. The illustrated flat plate 19 is generally oval in shape and is provided with a pair of holes 23 which may be used in mounting the signaling device 7.

The supporting base 11 may be made of any suitable material, and the reflecting member 9 may be attached to the base 11 by any suitable means, such as by gluing. Preferably, the supporting base is made of plastic material so that the reflecting member 9 may be easily embedded herein. Signaling devices 7 of this type can be economically made by injection molding the base 11 of a thermoplastic material while using the reflecting member 9 as an insert in the injection die mold. The devices 7 may also be economically made using other plastic resins, such as epoxy resins, by casting the supporting base 11 about the reflecting member 9 in a suitable mold, etc.

It is preferable to provide the glass lens 13 with an outwardly extending flange 25. The base 11 is provided with a circular ring or abutment 27 which is proportioned is mate with or to overlay the flange 25. The abutment 27 is easily formed in either of the above molding processes by allowing the plastic molding material to flow over the flange 25. This arrangement securely retains the reflecting member 9 within the supporting base 11.

The ridge 21 is preferably, but not necessarily, formed integrally with at least a portion of the flat plate 19 for ease in manufacture. The base 11 may be formed as a single piece or in two sections, as is shown in FIGURE 3. In the illustrated embodiment, a front portion 29 is formed which includes the ridge 21 and the forward section of the flat plate 19. A rear portion 31, which comprises the rear section of the plate 19, is formed separately from the front portion 29, but preferably of the same material. This construction allows the reflecting member 9 to be inserted in a pre-formed front portion 29 of the base 11 and then secured therein by joining the front and rear portions 29, 31 to form the complete signaling device 7. The front and rear portion 29, 31 may be joined in any suitable manner, as by gluing, heat-sealing, etc.

As can be seen in FIGURE 1, the complete signaling device 7 provides a reflecting member 9 disposed within a type of shadowbox, formed by the surrounding ridge 21. This arrangement produces an improved device which can be seen at greater distances and at angles at which a reflector by itself would not be visible. The surrounding ridge 21 directs light to and from the reflecting member 9. When a beam of light is shined on the device 7 from a side angle, light rays which would otherwise miss the reflecting member 9 strike the inner surface of the ridge 21 and are directed to the member 9. The surrounding rim 21 also serves to block some of the rays reflected from the member 9, which would otherwise go off in diverse directions, and direct them back toward the source of light. Thus, the signaling device 7 reflects light with a greater intensity than a similar reflecting member without a surrounding rim 21 and can be more clearly seen from side angles.

As previously stated, it is also desirable to provide a signaling device which can be clearly seen even when no light is directed upon it. Such a self-illuminating feature provides other advantageous safety characteristics for a signaling device which are of special interest to pedestrians and others who may travel a roadway without adequate headlights. By producing a base 11 from a phosphorescent material, a double-action signaling device 7 is provided which not only has the improved reflecting features noted above, but also has self-illuminating characteristics. Such devices point out objects even when no light is directed upon them.

Although the base 11 can be made phosphorescent in a number of ways, as by coating or painting the base 11 with a phosphorescent material, preferably, the base 11 is made from a plastic material having a phosphorescent material dispersed throughout it. Because it is contemplated that the signaling devices 7 will be used in locations where they will be constantly exposed to the weather, dispersion of the phosphorescent material within the base itself has proved more satisfactory than the use of a phosphorescent coating, which has the inherent problems of peeling, blistering, etc.

It is also desirable to provide a signaling device 7 which will glow all night after being charged during daylight hours; dispersion of phosphors within a plastic medium has proved superior for this purpose. By mixing the phosphorescent material with the plastic molding compound, a sufficient amount of phosphorescent material can be incorporated in the base 11 to provide a glow which will last throughout the night, i.e. for about a twelve-hour period.

There are a variety of inorganic phosphors which are suitable for use to produce phosphorescence. Generally, these phosphors are made up of a host material and one or more additional materials, termed activators. The activators cause the host material to phosphoresce. Some of the more important host materials are the silicates, phosphates, sulfides, selenides, the alkaline halides, and the oxides of the calcium, magnesium, barium and zinc. Activators suitable for use with these host materials include manganese, copper, silver, thallium, lead, cerium, chromium, titanium, antimony and tin. Zinc sulfide, with suitable activators selected from the above group, has been found to be especially suitable for the present application. Zinc sulfide is compatible with a wide variety of the plastic materials from which the bases 11 can be molded. Thus, it can be easily incorporated into the bases in sufficient amounts to impart phosphorescence thereto which will last for the desired period. Bases 11 for the signaling devices 7 have been cast from epoxy materials with a zinc sulfide phosphorescent dispersed therein. In this manner, signaling devices 7 with the desirable features mentioned above have been successfully produced.

The entire base 11 may be made of a plastic material having phosphors dispersed throughout, or, if it is desired to reduce the overall cost of material, only the front portions 29 of the bases 11 need be fabricated of the phosphorescent mixture. The rear portions 31 may be later cast using plastic materials without the phosphors. Likewise, rear portions 31 may be injection-molded of thermoplastic material without phosphors and then heat-sealed to corresponding front portions 29 which have been injection-molded of the phosphor-containing thermoplastic.

The alternate embodiment shown in the FIGURES 4 and 5, illustrates a signaling device 35 having a reflecting member 37 disposed in the center of a supporting base 39. The base 39 is constructed generally similarly to the previously described base 11 and has a front portion 41 including an upstanding rim 43 and a flat rear portion 45. A central hole 47 is provided which extends directly through the reflecting member 37 and in which a grommet 49 is disposed. The hole 47 allows the device 35 to be easily mounted by means of a nail, screw, or other such implement.

The signaling device 37 comprises a lens 51 and a flat backing element 53. In this embodiment, the lens 51 is made of a translucent material, such as clear glass or plastic, with prismatic undercuttings 55 which create reflecting surfaces. The backing element 53 is made of phosphorescent material. Alternately, the backing element 53 may be omitted, and a phosphorescent rear base portion 45 provided. The front portion 41 of the base is also made of phosphorescent material.

The reflecting member 37 may be joined with the base 39 in any suitable manner, or they may be formed as one integral piece, as set forth above with respect to the signaling device 7. However, if the backing element 53 is omitted and the base is cast from phosporescent plastic resin, it is important that none of the resin should coat the inclined reflecting surfaces formed by the undercuttings 55. Coating of these surfaces will impair the reflective characteristics of the lens 51.

In the signaling device 35, the glow from the phosphorescent material disposed directly behind the lens 51 shows directly through the clear lens 51 so that, when no light is directed upon the device 35, an overall glow is emitted from the entire surface of the device 35. When a beam of light is directed upon the device 35, the prismatic undercuttings 55 of the lens 51 reflect the light directed thereon back toward the source of the light, with a scintillating jewel-like effect. Thus, there is provided an improved signaling device the entire face of which is phosphorescent. The signaling device 35 is provided with the improved features, noted hereinbefore with respect to the signaling device 7, without lessening its overall phosphorescent area to achieve this desirable effect.

In another embodiment, a self-luminous material is employed for the portions of the signaling devices 7 and 35 that were hereinbefore specified as being made from phosphorescent material. A self-luminous material generally includes a radioactive substance, such as a radium compound or a radioactive isotope. The radioactive substance, as a result of its decay process, gives off sufficient energy to activate an accompanying fluorescent material, such as a tungstate or a platinocyanide, or an accompanying phosphorescent material, such as those hereinbefore noted. A satisfactory self-luminous device is provided by adding a suitable radioactive isotope to the zinc sulfide phosphorescent material previously described.

By using a self-luminous material, a signaling device is provided which will glow for an indefinite time regardless of its exposure to light and which will intensely reflect a light directed upon it. Such a signaling device is especially adaptable for underground installations, darkrooms, tunnels, etc.

While the above invention has been described with regard to specific embodiments, it is noted that this description is intended to be merely illustrative of the invention and not to constitute limitations upon its scope. Modifications and equivalents that will be apparent to those skilled in the art are contemplated as being within the scope of the invention.

Various of the features of the invention are set forth in the following claims.

What is claimed is:

1. A signaling device which comprises means defining a phosphorescent support base having an upstanding element extending outwardly from a surface thereof, and a prismatically reflective lens of translucent material mounted on said surface adjacent said element whereby the device gives off a phosphorescent glow across said entire surface yet reflects light directed onto said lens.

2. A signaling device especially suited for use as a highway safety marker, which device comprises a supporting base formed of plastic with a phosphorescent material dispersed therein, a translucent prismatically reflective lens mounted generally centrally on one surface of said base, said base including a ridge extending generally perpendicularly outward from said surface and surrounding the periphery of said lens so that said lens is recessed within said ridge and also including a phosphorescent portion disposed adjacent the rear surface of said lens so that said entire surface gives off a phosphorescent glow.

3. A signaling device which comprises means defining a self-luminous support base having an upstanding element extending outwardly from a surface thereof, and a prismatically reflective lens of translucent material mounted on said surface adjacent said element whereby the device gives off a continuous glow across said entire surface yet reflects light directed onto said lens.

4. A signaling device especially suited for use as a highway safety marker, which device comprises a supporting base formed of plastic with a sufficient amount of a zinc sulfide phosphorescent material dispersed therein so that said base will glow for a period of at least twelve hours after a single charging, a prismatically reflective lens mounted centrally on said base, said base including a perpendicularly outwardly extending annular ridge surrounding the periphery of said lens and immediately adjacent thereto so that said lens is recessed within said ridge, and an element having a shiny surface disposed adjacent the rear surface of said lens so as to improve the light-reflecting characteristics of said lens.

References Cited by the Examiner

UNITED STATES PATENTS

| | | | |
|---|---|---|---|
| 1,412,955 | 4/1922 | Nelsen | 250—77 |
| 2,361,319 | 10/1944 | Paul | 250—71 |
| 2,503,044 | 4/1950 | Guerra | 250—77 |
| 2,542,894 | 2/1951 | Blanchard | 250—77 X |
| 2,953,684 | 9/1960 | MacHutchin et al. | 250—71 |
| 3,005,102 | 10/1961 | MacHutchin et al. | 250—77 |

RALPH G. NILSON, *Primary Examiner.*

ARCHIE R. BORCHELT, *Examiner.*